US008199741B2

(12) United States Patent
Al et al.

(10) Patent No.: US 8,199,741 B2
(45) Date of Patent: Jun. 12, 2012

(54) SYNCHRONIZATION SCHEDULING METHOD

(75) Inventors: Jianxun Al, Guangdong (CN); Hengxing Zhai, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/127,291

(22) PCT Filed: Apr. 28, 2009

(86) PCT No.: PCT/CN2009/071538
§ 371 (c)(1),
(2), (4) Date: May 3, 2011

(87) PCT Pub. No.: WO2010/054545
PCT Pub. Date: May 20, 2010

(65) Prior Publication Data
US 2011/0216756 A1    Sep. 8, 2011

(30) Foreign Application Priority Data

Nov. 11, 2008  (CN) .......................... 2008 1 0182127

(51) Int. Cl.
*H04J 3/06*    (2006.01)
*H04B 7/212*    (2006.01)

(52) U.S. Cl. ......................... 370/350; 370/342; 370/347

(58) Field of Classification Search .................. 370/342, 370/347, 350
See application file for complete search history.

(56) References Cited

U.S. PATENT DOCUMENTS

| 5,909,447 A * | 6/1999 | Cox et al. ........................ 370/508 |
| 6,654,375 B1 * | 11/2003 | Vedder ........................... 370/394 |
| 7,797,536 B1 * | 9/2010 | Lyle ................................ 713/168 |

FOREIGN PATENT DOCUMENTS

| CN | 101043265 A | 9/2007 |
| CN | 101282230 A | 8/2008 |
| KR | 20080069112 A | 7/2008 |

OTHER PUBLICATIONS

International Search Report on international application No. PCT/CN2009/071538, mailed on Aug. 20, 2009.
English Translation of the Written Opinion of the International Search Authority in international application No. PCT/CN2009/071538, mailed on Aug. 20, 2009.
International Search Report in international application No. PCT/CN2009/071538,mailed Aug. 20, 2009.

* cited by examiner

*Primary Examiner* — Kenny Lin
(74) *Attorney, Agent, or Firm* — Oppedahl Patent Law Firm LLC

(57) ABSTRACT

The present invention discloses a synchronization scheduling method. The method includes that: sending a plurality of data bursts of a specified service by an upper network element to specified network elements belonging to the upper network element, wherein data packets of the data bursts include time stamp information so that the specified network elements send the data bursts according to the time stamp information; and setting difference between the time stamp information of every two adjacent data bursts by the upper network element to be an integer multiple of the TDM period of the specified service, wherein length of the TDM period is one of exactly divided parts of a system frame number period of a radio interface.

11 Claims, 6 Drawing Sheets

SYNCHRONIZATION SCHEDULING METHOD

CROSS REFERENCES TO RELATED APPLICATIONS

This application is a U.S. national phase application pursuant to 35 U.S.C. §371, of PCT/CN2009/071538 filed on Apr. 28, 2009, which claims priority to Chinese Patent Application No. 200810182127.4 filed on Nov. 11, 2008. The entire contents of the aforementioned patent applications are incorporated herein by these references.

TECHNICAL FIELD OF THE INVENTION

The present invention relates to the field of communications and particularly to a synchronization scheduling method.

BACKGROUND OF THE INVENTION

Along with the development of Internet, a great many multimedia services emerge and people's demands on mobile communications are no longer limited to telephone and message services. At present, application services have been introduced into multimedia services. The feature of application services is that same data may be received by a plurality of users in the same time, for example: VOD (Video On Demand), telecast, video conference, online education and interactive games.

In order to effectively use the resources of mobile networks, Multimedia Broadcast Multicast Service (MBMS) technology was introduced. The MBMS is a Point-To-Multipoint service in which a data source sends data to a plurality of users. Through this service, the sharing of network resources can be realized, including the sharing of mobile core network and access network resources, particularly the sharing of air interface resources. Further, the MBMS in 3GPP not only can realize the multicast and broadcast of pure-text low-speed messages but also can realize the multicast and broadcast of high-speed multimedia services.

As the MBMS is a service catering for the whole network, a same MBMS may be established at different lower network element nodes. FIG. 1 is a flow chart of the method for synchronization processing of the MBMS in a plurality of network elements in the prior art, and the method includes the following processing.

S102, sending an MBMS data packet by the upper network element to the lower network elements. This data packet includes service data and time stamp information, data packet sequence number information and accumulated service data length information. The upper network element marks same time stamp information for one or a plurality of continuous data packets. These data packets marked with the same time stamp constitute a data burst or synchronization sequence. Particularly, the upper network element marks each data packet as a data burst or synchronization sequence. In this case, each data burst or synchronization sequence only contains one data packet.

S104, conducting RLC (Radio Link Control) protocol-layer tandem connection processing of the service data included in the data packets of a same data burst by the lower network elements, while no RLC tandem connection processing is conducted for the data packets of different data bursts. Moreover, when conducting the RLC protocol-layer processing of the data packets of a same data burst, the RLC sequence numbers in RLC protocol-layer will be reset starting from the first data packet of each data burst. That is to say, starting from the first RLC PDU (Protocol Data Unit) of the first data packet of each data burst, RLC sequence numbers will be distributed from a specified or configured fixed value. In the prior art, when a plurality of continuous data packets are lost during transmission from an upper network element to lower network elements, the lower network elements will be unable to judge the RLC PDU length occupied by the lost data packets during RLC processing, thereby the network elements of which packets are lost will be unable to maintain consistent with other network elements during the follow-up RLC processing. Like that, to reset the RLC sequence numbers at the beginning of each data burst may avoid the foregoing problem and guarantee the consistence of RLC sequence number of each network element at the beginning of each data burst.

S106, sending the data packets in turn for the service data included by the data packets of a same data burst by the lower network elements via a radio interface starting from the transmission time corresponding to the time stamp marked in the data packets. As the foregoing information sent by the upper network element to the lower network elements is identical, the lower network elements may conduct identical processing. In this way, the synchronous transmission of MBMS among the cells of the lower network elements is realized.

Currently, the time stamp information of each data packet may be set in the following two ways.

Way 1: The upper network element marks time stamps according to the receiving moments of data packets, and a same time stamp is marked for the data packets received within a specific length of time interval, wherein the specific length of time interval is called synchronization sequence length or scheduling period. Under this circumstance, the length of the scheduling period is equal to the length of the time stamp interval of the adjacent data bursts.

Way 2: The upper network element virtualizes the RLC protocol-layer processing of the lower network elements. According to the result of the virtualized RLC processing, the data packets which need to undergo RLC tandem connection processing are marked with a same time stamp. In this technology, the length of the scheduling period is the minimum value of the time stamps of the adjacent data bursts.

In view of the foregoing two setting methods, the time stamp information rests with the time when data packets arrive at the upper network element, so the time stamp intervals of the data packets are not fixed. It is supposed that the service data stream the upper network element receives are the data stream shaped based on QoS. In other words, in any period of time, bandwidth of the service data stream does not exceed the maximum bandwidth defined by QoS parameters, and it is supposed that the channel resources of the radio interface in the foregoing period of time match the QoS parameters.

An MBMS may be sent via a radio interface by means of Time Division Multiplex (TDM). The configuration of TDM contains the following parameters: TDM period, TDM offset and TDM repetition length. The TDM resources available to a service may be expressed as follows: (the result of System Frame Number (SFN) divided with no remainder by the number of 10 ms radio frames contained in a TTI) modulo (TOM period)=TDM offset+i, wherein i=0, 1, (TDM period−1). Specifically, an MBMS is sent in the distributed TDM period, for consecutive TDM repetition length of TTI (Transmission Time Interval) starting from the (TDM offset)$^{th}$ TTI. The maximum TOM repetition period is 9. The TTI length that may be used by MBMS is 40 ms or 80 ms. A service may be sent via a radio interface only within the available transmission time configured in the TDM period.

When data are sent by means of TDM, as the transmission time of an MBMS on a radio interface is discontinuous and appears cyclically and periodically according to the configuration of TDM. As the time stamps are uncertain in the current scheduling method, probably the time stamp information is unable to directly correspond to the initial time when the MBMS may be sent via the radio interface. That is to say, the time stamp and the radio interface transmission time (available transmission time) cannot form one-to-one correspondence. For example, the scheduling period and TDM period are not mutually matched as shown in FIG. 2.

FIG. 3 is a schematic showing inconsistent distribution of the resources to which different scheduling periods correspond. As shown in FIG. 3, in the TDM configuration mode, as the radio channel resources are discontinuous, the available radio resources in different locations at a same time period are different. In this case, the scheduling algorithm in the prior art will generate a wrong result. The data packets to be sent in a specific period of time supposed by the scheduling algorithm in the prior art might not be sent via the radio interface, and overflowing may occur. This will lead to the loss of service data and seriously impair service reception quality.

SUMMARY OF THE INVENTION

To address the problem in the related art that the current scheduling method results in loss of service data and serious impairment of service reception quality, the present invention is put forth. The main object of the present invention is to provide a synchronization scheduling method, to solve the foregoing problem.

In order to realize the foregoing object, according to one aspect of the present invention, a synchronization scheduling method is provided.

The synchronization scheduling method according to the present invention comprises that: sending a plurality of data bursts of a specified service by an upper network element to specified network elements belonging to the upper network element, wherein data packets of the data bursts include time stamp information so that the specified network elements send the data bursts according to the time stamp information; and setting difference between the time stamp information of every two adjacent data bursts by the upper network element to be an integer multiple of a TDM (Time Division Multiplex) period of the specified service, wherein length of the TDM period is one of exactly divided parts of a system frame number period of a radio interface.

According to another object of the present invention, a synchronization scheduling method is provided.

The synchronization scheduling method according to the present invention comprises that: sending a plurality of data bursts of a specified service by an upper network element to specified network elements belonging to the upper network element, wherein data packets of the data bursts all include time stamp information so that the specified network elements send a plurality of the data bursts according to the time stamp information; and setting difference between the time stamp information of every two adjacent data bursts by the upper network element to be one of exactly divided parts of a TDM period of the specified service, wherein length of the TDM period is one of exactly divided parts of a system frame number period of a radio interface.

In the methods provided by the present invention, the scheduling period of a service is determined according to the TDM period and the service data are processed. Compared to the prior art, the present invention can avoid the uneven resource distribution caused by discontinuous distribution of radio interface resources under the condition of TDM configuration so as to prevent the service data bursts from overflowing and avoid the loss of the service data.

BRIEF DESCRIPTION OF THE DRAWINGS

The accompanying drawings are intended to provide further understanding on the present invention and constitute a part of this description. They together with the embodiments of the present invention are intended to explain the present invention and not to limit the present invention. Among the drawings.

DETAILED DESCRIPTION

Function Overview

Basic approach of the present invention: in the current TDM configuration method, as the radio channel resources are discontinuous, the available radio resources in different locations at a same time period are different. Under this circumstance, the scheduling algorithm in the prior art will generate a wrong result. On this basis, the present invention provides a synchronization scheduling method: setting the scheduling period of the service to be an integer multiple of the TDM period and sending data bursts in the TDM period according to time stamp information.

The present invention is described below in details in connection with the accompanying drawings.

Method Embodiment One

According to an embodiment of the present invention, a synchronization scheduling method is provided.

It should be noted that for easy description, the technical solution of the method embodiments of the present invention are shown and described in form of steps in the text below, and the steps shown in the text below may be executed, for example, in a computer system with a group of computer-executable instructions. A logic sequence is shown in related accompanying drawings, but in some cases, the shown or described steps may be executed in a sequence different from this sequence.

Figure 1:
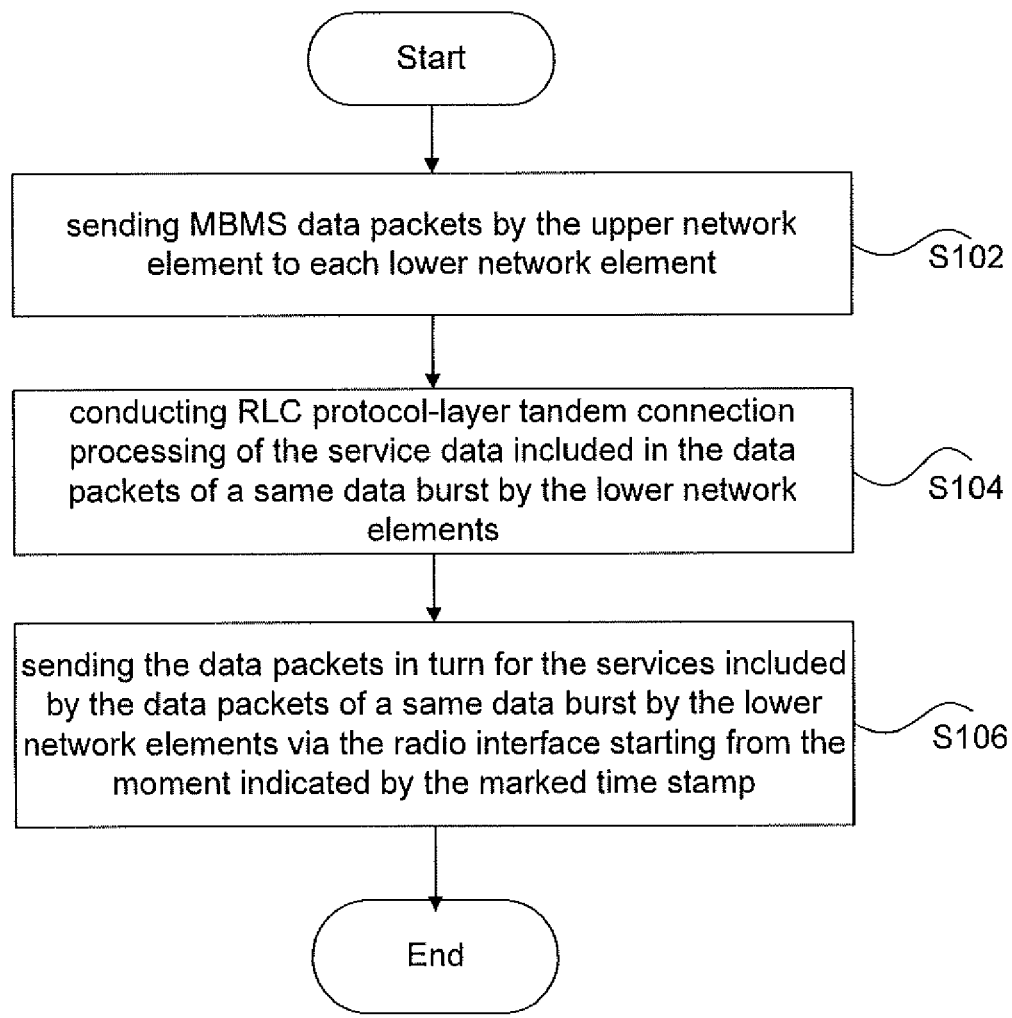
FIG. 1 is a flow chart of a method for synchronization processing of the MBMS in a plurality of network elements in the prior art.
Figure 2:
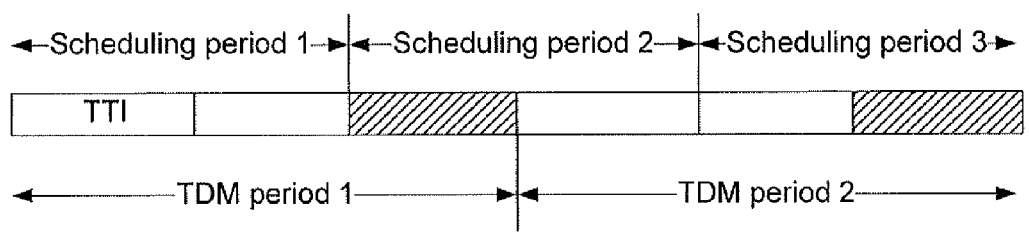
FIG. 2 is a schematic of an example showing mismatch between scheduling period and TDM period in the prior art.
Figure 3:
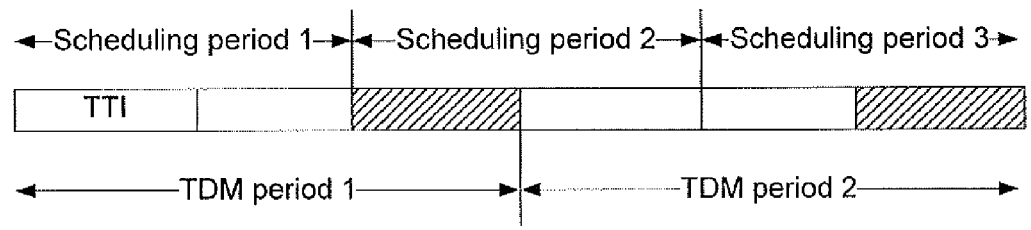
FIG. 3 is a schematic of an example showing inconsistent distribution of the resources to which different scheduling periods correspond in the prior art.
Figure 4:
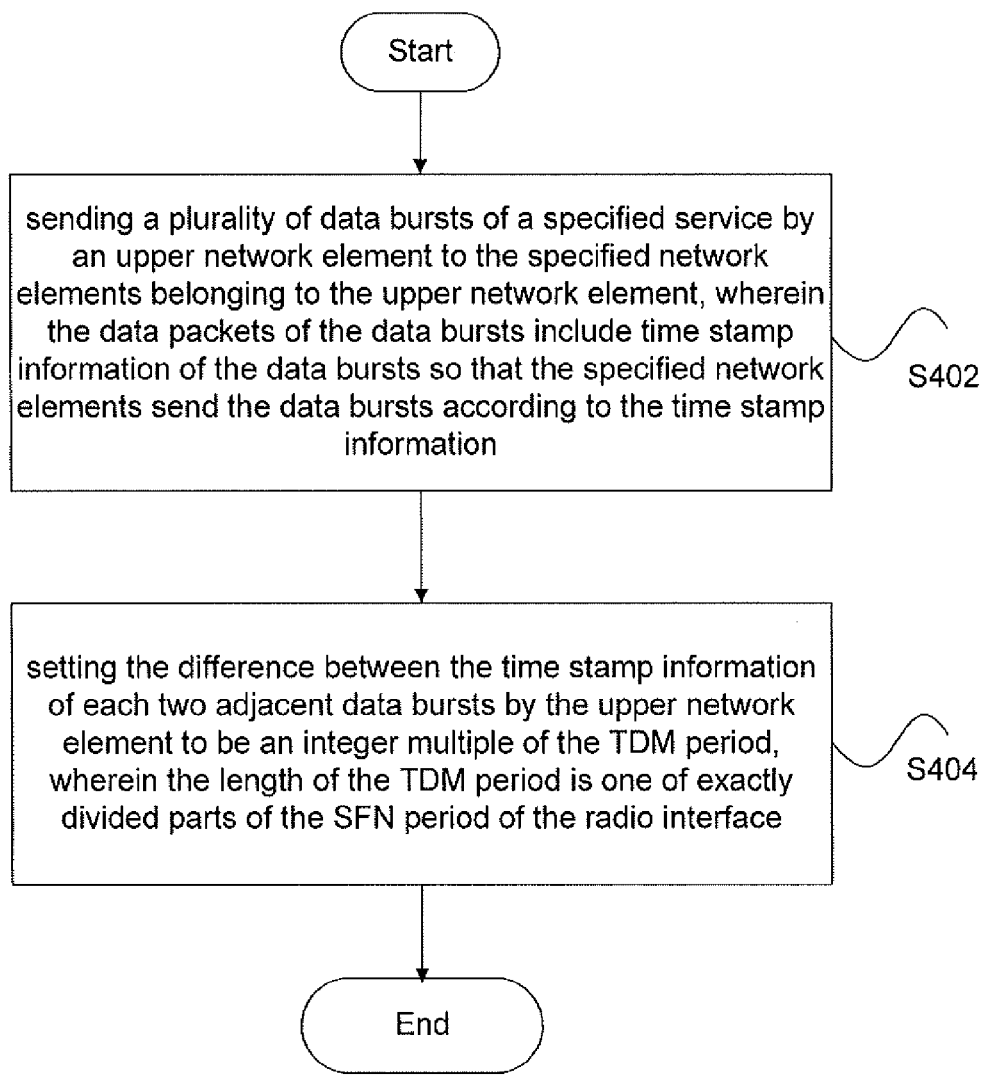
FIG. 4 is a flow chart of a synchronization scheduling method according to Method Embodiment One of the present invention.

FIG. 4 is a flow chart of a synchronization scheduling method according to a method embodiment of the present invention. As shown in FIG. 4, this method includes the following steps (S402~S404):

S402: sending a plurality of data bursts of a specified service by an upper network element to specified network elements belonging to the upper network element, wherein the data packets of the data bursts include time stamp information of the data bursts, sequence number of the data packets and accumulated data length so that the specified network elements send the data bursts in the TDM period according to the time stamp information. A data burst is a group of data packets with the same time stamp information;

S404: setting the scheduling period of the service data as an integer multiple of the TDM period by the upper network element, so as to set difference between the time stamp information of every two adjacent data bursts to be an integer multiple of the TOM period, and setting the difference between the time stamp information of the adjacent data bursts to be one of exactly divided parts of a system frame number period of a radio interface.

Currently, the time stamp information of each data packet may be set in the following two ways:

Way 1: The upper network element marks time stamps according to its data packet receiving moments and a same time stamp is marked for the data packets received within a specific length of time interval, wherein the specific length of time interval is called synchronization sequence length or scheduling period. Under this circumstance, the length of the scheduling period is equal to the length of the time stamp interval of adjacent data bursts.

Way 2: The upper network element virtualizes the RLC protocol-layer processing of the lower network elements. According to the result of the virtualized RLC processing, the data packets which need to undergo RLC tandem connection processing are marked with a same time stamp. In this technology, the length of the scheduling period is the minimum value of the time stamps of the adjacent data bursts.

Further, the foregoing TDM period may be preset in the following five ways.

Way 1: the upper network element configures the TDM period of the specified service and informs the specified network elements of the configured TDM period; or, Way 2: the specified network elements configure the TOM period of the specified service and inform the upper network element of the configured TDM period; or Way 3: the upper network element configures the TDM period of all services and informs the specified network elements of the configured TDM period; or Way 4: the upper network element and the specified network elements all obtain the TOM period through configuration; or Way 5: for all the services sent via the radio interface by means of TDM, the upper network element configures a scheduling period which meets the following condition: the scheduling period is an integer multiple of the TDM period of all services.

The lower network elements map the received data bursts according to the time stamp information and send the received data bursts starting from the mapped TDM period. A data burst may continuously occupy a plurality of TDM periods. The specific mapping method may include any one of the following four methods.

I. When time stamp information corresponds to the initial moment of the current TDM period, the specified network elements send the data bursts to which the time stamp information corresponds starting from the initial moment of the available transmission time of the current TDM period.

II. When the time stamp information does not correspond to the initial moment of the current TDM period, the specified network elements send the data bursts to which the time stamp information corresponds starting from the initial moment of the available transmission time of the TDM period next to the current TDM period.

III. When the time stamp information corresponds to the initial moment of the available transmission time of the current TDM period, the specified network elements send the data bursts to which the time stamp information corresponds starting from the initial moment of the available transmission time of the current TDM period.

IV. When the time stamp information does not correspond to the initial moment of the available transmission time of the TDM period, the specified network elements send the data bursts to which the time stamp information corresponds starting from the initial moment of the available transmission time of the TOM period next to the current TDM period.

Further, the foregoing available transmission time is a time period of the radio interface resources for sending the data packets.

In order to avoid the uneven radio resource distribution in the transmission scheduling period in the present method as a result of the length of the TDM period being not one of exactly divided parts of the SFN period, the TDM period length of the service should be set to be one of exactly divided parts of the SFN period. This is because the value of the TDM period of the current MBMS is a value from 2 to 9, i.e. one TDM period has a length of 2×TTI to 9×TTI. The SFN of the radio interface is 4096×10 ms. Supposing the length of one TTI is 4×10 ms, an SFN period will contain 1024×TTI. Considering the value range of the TDM period, if the number of TTIs contained in a TDM period is not one of exactly divided parts of 1024, the number of TDM periods contained in one SFN period will not be an integer. That is to say, it is likely that at the tail of the SFN period there is only a partial TDM period, so the resources available to the service in the time length of this partial period will be inconsistent with other periods. In the scheduling method according to the embodiment of the present invention, the upper network element supposes the radio interface resources distributed by the lower network elements are evenly distributed, if the TDM period is not one of exactly divided parts of the length of the SFN period, this assumption will be false, so the length of the TDM period should be set to be one of exactly divided parts of the SFN period.

In order to avoid the uneven radio resource distribution in the transmission scheduling period in this method as a result of the length of the TDM period being not one of exactly divided parts of the SFN period, the upper network element needs to set the scheduling period to be one of exactly divided parts of the SFN period, too. The reason is the same as why the TDM period needs to be set as one of exactly divided parts of the SFN period.

Through the technical solution provided by the embodiment of the present invention, the scheduling period of a service is determined according to the TDM period and the service data are processed. Compared to the prior art, the present invention can avoid the uneven resource distribution caused by discontinuous distribution of radio interface resources under the condition of TDM configuration so as to prevent the service data bursts from overflowing and avoid the loss of the service data.

Before description of the embodiment of the present invention, the upper network element and the lower network elements are described.

The upper network element is used for implementing the scheduling of the received MBMS data packets. Specifically, the upper network element marks each data packet with time stamp information and the data packets marked with same time stamp information are called a data burst or a synchronization sequence. Later, it sends the data packets marked with time stamp information, sequence number and accumulated data packet length to one or a plurality of lower network elements belonging to this upper network element.

The lower network elements are used for receiving the data packets sent by the upper network element and calculate the initial time to send a data burst according to the time stamp information of each data packet. During RLC protocol-layer processing, the lower network elements perform RLC tandem connection processing of the data packets of a same data burst, and send the data packets which have undergone user plane protocol processing in radio network layer via the radio interface.

Figure 5:
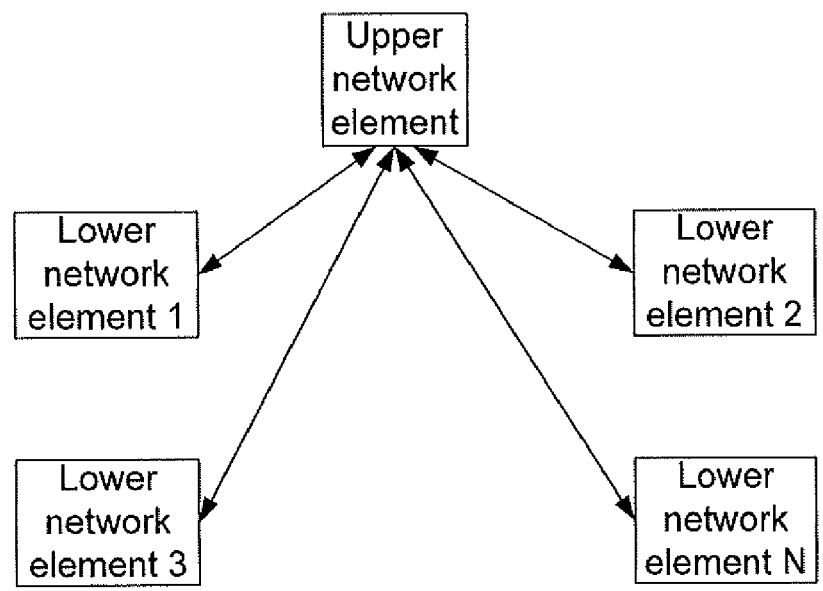
FIG. 5 is a framework diagram illustrating a logic structure of an upper network element and lower network elements according to the present invention.

FIG. 5 is a framework diagram of a logic structure of an upper network element and lower network elements. As shown in FIG. 5, an upper network element is connected to a plurality of lower network elements and performs signaling interaction. It should be noted that an upper network element and one or a plurality of lower network elements belonging to this upper network element may be same or different network elements in terms of physical function, and they are classified into upper network element and lower network element only logically, aiming to collaborate with each other to complete the function of service synchronization. In other words, a number of same or different physical network elements are classified into an upper network element and a certain number of lower network elements by logical function. These network elements collaborate and cooperate with each other to realize the MBMS sent by multi-cell combination method among the cells of the lower network elements.

Further, the upper network element and the lower network elements may adopt, but are not limited to the following network element combinations:

Combination 1: In the synchronous networking of MBMS in a Universal Terrestrial Radio Access Network (UTRAN) system, the upper network element is an upper Radio Network Controller (RNC) and the lower network element is a lower RNC, wherein the interface between the upper network element and the lower network element is an Iur interfaces. In this combination, the upper network element and the lower network elements are network elements with a same physical function.

Combination 2: In the synchronous networking of MBMS in an enhanced High Speed Packet Access Plus (HSPA+) system, the upper network element is a Gateway GPRS Support Node (GGSN), a Serving GPRS Support Node (SGSN) or a Broadcast Multicast Service Center (GMSC) and the lower network element is an RNC or a Node+ (NB+).

Combination 3: In the synchronous networking of MBMS in a Long-Term Evolution (LTE) system, the upper network element is an MBMS Gateway (MGW) or a Multi-cell/Multicast Coordination Entity (MCE), and the lower network element is an evolved Node B (i.e. E-UTRAN Node B).

Example

In the implementation process, the upper network element firstly needs to obtain the TDM configuration information of the service, which must include the TDM period information.

Preferably, it may further include TDM offset and repetition length information, wherein the TDM period length of the service is configured as one of exactly divided parts of the system frame number period of the radio interface.

Further, the upper network element may obtain the TDM configuration information of the service by the following methods:

1. through configuration, the upper network element configures the TDM configuration information of a service, and the lower network elements maintain consistence of the TDM configuration information of the service;

2. the upper network element informs the lower network elements of the TDM configuration parameters of a service by means of signaling, and the lower network elements distribute the resources according to the TDM configuration parameters informed by the upper network element;

3. the lower network elements inform the upper network element of the TDM configuration parameters of a service by means of signaling;

4. for all the MBMS sent via the radio interface by means of TDM, the upper network element configures a scheduling period which meets the following condition: the scheduling period is an integer multiple of the TDM periods of all services.

The upper network element marks the received data packets with time stamps. A same time stamp is marked for the data packets of a same data burst. Each data packet of the data bursts is marked with data packet sequence number and accumulated data length information and is scheduled according to the TDM configuration information. The scheduling period is an integer multiple of the TDM period so that the time interval of adjacent time stamps is an integer multiple of the TDM period. The specific scheduling method may be the following method, but not limited to it. As long as the time interval of adjacent time stamps is an integer multiple of the TDM period, the requirement of the present invention will be met. For example, the scheduling method may be that the upper network element performs scheduling according to the receiving time of data packets, and marks the data packets received in a time interval which is an integer multiple of the TDM period of this service as a data burst (or called a synchronization sequence). Alternatively, the scheduling method may further be that the upper network element sets the scheduling period according to the TDM period, wherein the scheduling period is an integer multiple of the TDM period, performs virtual RLC tandem connection of the received data packets, and marks the data packets which meet the conditions of virtual tandem connection as a same data burst or synchronization sequence.

As the resources configured in each TDM period of a service are the same, the upper network element may accurately obtain the magnitude of the corresponding radio resources according to the number of TDM periods occupied by a data burst.

The upper network element sends the data packets marked with time stamp information to the lower network elements according to the scheduling period. The lower network elements map time stamps to the radio interface resources according to the marked time stamp information of the data packets, wherein there may be the following four time stamp mapping methods.

Figure 6:
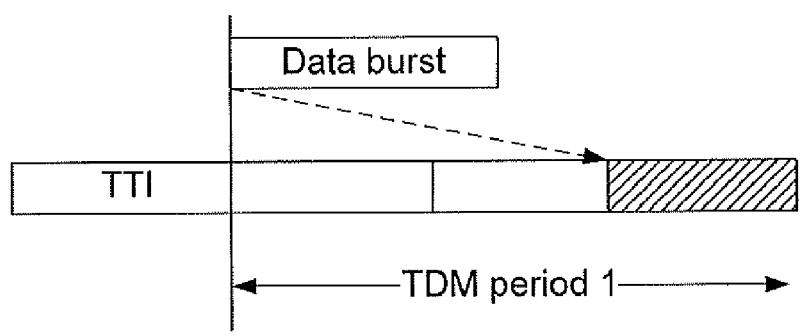
FIG. 6 is a schematic 1 of a time stamp mapping method according to an embodiment of the present invention.

1. In the time stamp mapping method as shown in FIG. 6, when the time stamp information of the data burst just corresponds to the initial moment of a TOM period of this service, the lower network elements send the data packets of this data burst starting from the resources distributed for this service in this TDM period.

Figure 7:
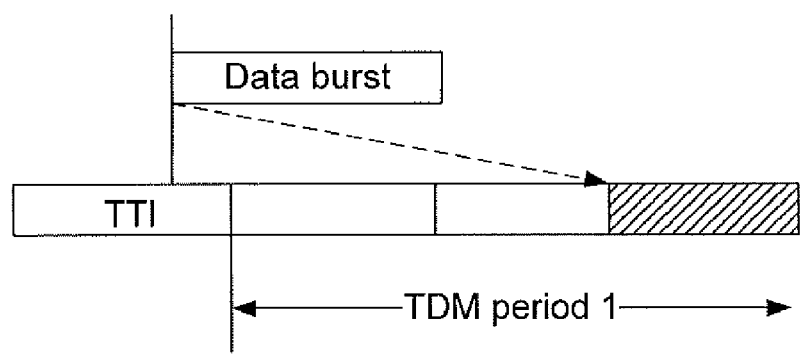
FIG. 7 is a schematic 2 of a time stamp mapping method according to an embodiment of the present invention.

2. In the time stamp mapping method as shown in FIG. 7, when the time stamp information of the data burst does not just correspond to the initial moment of a certain TDM period of this service, the lower network elements send the data packets of this data burst starting from the resources distributed for this service in the next TDM period.

Figure 8:
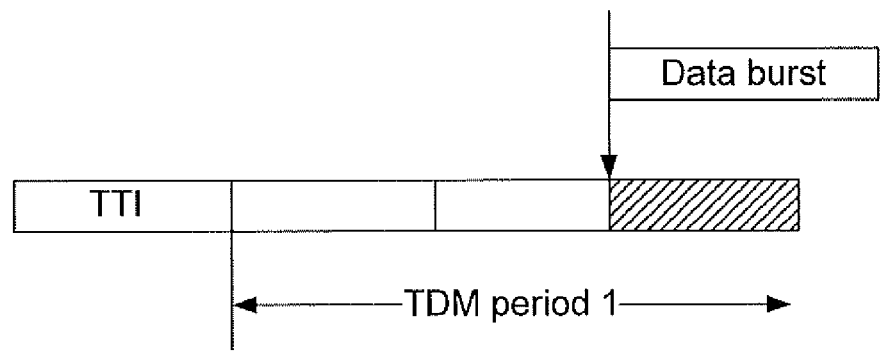
FIG. 8 is a schematic 3 of a time stamp mapping method according to an embodiment of the present invention.

3. In the time stamp mapping method as shown in FIG. 8, when the time stamp information of the data burst just corresponds to the initial moment of the resources distributed in a TDM period of this service, in other words, the time stamp just corresponds to the offset in a TDM period of this service, the lower network elements send the data packets of this data burst starting from the resources distributed by this service in this TDM period.

Figure 9:
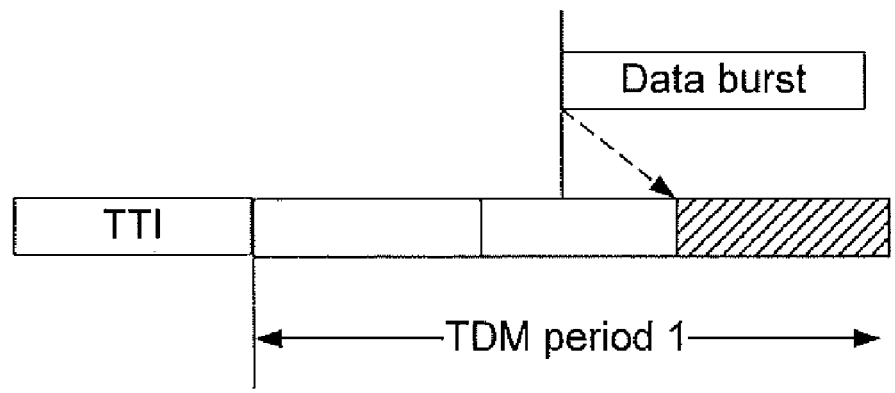
FIG. 9 is a schematic 4 of a time stamp mapping method according to an embodiment of the present invention.

4. In the time stamp mapping method as shown in FIG. 9, when the time stamp information of the data burst does not just correspond to the initial moment of the resources distributed in a certain TDM period of this service, in other words, the time stamp is not equal to the offset in a TDM period of this service, the lower network elements send the data packets of this data burst starting from the resources distributed by this service in the next TOM period.

As the interval of adjacent time stamps is an integer multiple of the TDM period, one-to-one mapping between the time stamps and the TDM periods may be realized by the foregoing mapping.

Method Embodiment Two

According to an embodiment of the present invention, a synchronization scheduling method is provided.

The synchronization scheduling method according to the embodiment of the present invention comprises that: sending a plurality of data bursts of a specified service by an upper network element to the specified network elements belonging to the upper network element, wherein the data packets of the data bursts all include time stamp information so that the specified network elements send a plurality of the data bursts in the TDM period according to the time stamp information; and setting the difference between the time stamp information of every two adjacent data bursts by the upper network element to be one of exactly divided parts of the TDM period, and the TDM period length of the service to be one of exactly divided parts of the SFN period.

Wherein the upper network element may obtain scheduling period by the following methods:

I. Through management configuration, the GGSN obtains the TDM configuration parameters of each MBMS, and the upper network element selects for this service a scheduling period of which the length is one of exactly divided parts of the TDM period of this service.

II. The lower network elements send the TDM configuration of each service to the upper network element by means of signaling. The upper network element selects for this service a scheduling period of which the length is one of exactly divided parts of the TDM period of this service.

III. The upper network element distributes TOM parameters of each service and sends them to the lower network elements by means of signaling. According to signaling instruction, the lower network elements distribute the radio interface resources, and the upper network element selects for this service a scheduling period of which the length is one of exactly divided parts of the TDM period of this service.

IV. The upper network element configures a scheduling period for all services. The scheduling period is one of exactly divided parts of all possible TDM periods.

The upper network element schedules the received data packets of the service according to the scheduling period, and marks time stamp information for the data packets and sends the data bursts to the lower network elements. The lower network elements map the time stamps of the data bursts. A plurality of integral data bursts are mapped to a same TOM period. For a plurality of data bursts mapped to a same TDM period, the lower network elements send them in this TDM period in a sequence of their time stamps. The specific mapping method is shown below.

I. When the time stamp information of the data burst just corresponds to the initial moment of a TDM period of this service, the lower network elements map this data burst to this TDM period.

II. When the time stamp information of the data burst does not just correspond to the initial moment of a certain TDM period of this service, the lower network elements map this data burst to this TDM period.

III. When the time stamp information of the data burst just corresponds to the beginning of the resources distributed in a TDM of this service, that is to say, the time stamp just corresponds to the offset in a TDM period of this service, the lower network elements map this data burst to this TDM period.

IV. When the time stamp information of the data burst does not just correspond to the beginning of the resources distributed in a certain TDM period of this service, that is to say, the time stamp is not equal to the offset in a TDM period of this service, the lower network elements map this data burst to this TDM period.

In order to avoid the uneven radio resource distribution in the transmission scheduling period in the present method as a result of the length of the TDM period being not one of exactly divided parts of the SFN period, the TDM period length of the service should be set to be one of exactly divided parts of the SFN period. This is because the value of the TDM period of the current MBMS is a value from 2 to 9, i.e. one TDM period has a length of 2×TTI to 9×TTI. The SFN of the radio interface is 4096×10 ms. Supposing the length of one TTI is 4×10 ms, an SFN period will contain 1024×TTI. Considering the value range of the TDM period, if the number of TTIs contained in a TDM period is not one of exactly divided parts of 1024, the number of TDM periods contained in one SFN period will not be an integer. That is to say, it is likely at the tail of the SFN period there is only a partial TDM period, so the resources available to the service in the time length of this partial period are inconsistent with other periods. In the scheduling method according to the embodiment of the present invention, the upper network element supposes the radio interface resources distributed by the lower network elements is evenly distributed, if the TDM period is not one of exactly divided parts of the length of the SFN period, this assumption will be false, so TDM period length should be set to be one of exactly divided parts of the SFN period.

According to the method provided by the present invention, scheduling period or the interval of the time stamps of the adjacent data bursts is one of exactly divided parts of the length of TOM period, so if the TDM period is one of exactly divided parts of the SFN period, the length of the scheduling period certainly will be one of exactly divided parts of the SFN period.

Through the technical solutions provided by the embodiments of the present invention, the scheduling period of a service is determined according to the TDM period and the service data are processed. Compared to the prior art, the present invention can avoid the uneven resource distribution caused by discontinuous distribution of the radio interface resources under the condition of TDM configuration so as to prevent the service data bursts from overflowing and avoid the loss of the service data.

As shown above, with the help of the synchronization method provided by the present invention, the upper network element schedules the data packets of a service and marks the data packets of a service with time stamps according to the TDM period of this service, which may guarantee the interval of the time stamps of the adjacent data bursts is an integer multiple of the TDM period. Meanwhile, the TDM period of the service is set to be one of exactly divided parts of the SFN period, which may guarantee the number of the TDM periods in the SFN period distributed by this service is an integer and avoid the circumstances that the failure of one-to-one-mapping between the time stamp and the radio interface time and mapping of a plurality of data bursts to a same TDM period as the scheduling period or the interval of the adjacent time stamp is inconsistent with the TDM period. Further, in each scheduling period, the configured resources of this service at the radio interface are the same, which can avoid losing of the data to be sent as a result of the resource inconsistence of the data bursts scheduled by the upper network element in the corresponding radio interface time.

Apparently, those skilled in the art should understand the foregoing modules or steps of the present invention may be realized by general-purpose computing devices and may be concentrated on a single computing device or distributed in a network composed of a plurality of computing devices, optionally, may be realized by the program codes executable to computing devices, thereby may be stored in a storage device and executed by computing devices, or realized by making them into each separate Integrated Circuit (IC) module, or making a plurality of the modules or steps into a single IC module. In this way, the present invention is not limited to any specific combination of hardware and software.

The foregoing descriptions are preferred embodiments of the present invention and are not intended to limit the present invention. For those skilled in the art, the present invention may have various changes and modifications. All modifications, identical replacements and improvements made without departing from the spirit and principle of the present invention shall be within the protection scope of the present invention.

What is claimed is:

1. A synchronization scheduling method, comprising:
    sending a plurality of data bursts of a specified service by an upper network element to specified network elements belonging to the upper network element, wherein data packets of the data bursts include time stamp information so that the specified network elements send the data bursts according to the time stamp information; and
    setting difference between the time stamp information of every two adjacent data bursts by the upper network element to be an integer multiple of a Time Division Multiplex (TDM) period of the specified service, wherein length of the TDM period is one of exactly divided parts of a system frame number period of a radio interface.

2. The method of claim 1, further comprising: the difference between the time stamp information of the adjacent data bursts being set to be one of exactly divided parts of the system frame number period of the radio interface.

3. The method of claim 1, further comprising:
    presetting the TDM period before the upper network element sends a plurality of the data bursts.

4. The method of claim 3, wherein the step of presetting the TDM period comprises:
    the upper network element configures the TDM period of the specified service and informs the specified network elements of the configured TDM period; or
    the specified network elements configure the TDM period of the specified service and inform the upper network element of the configured TDM period; or
    the upper network element configures the TDM period of all services.

5. The method of claim 4, wherein the available transmission time is a time period of the radio interface resources used for sending the data packets.

6. The method of claim 1, further comprising:
    when the time stamp information corresponds to an initial moment of a current TDM period, sending the data bursts to which the time stamp information corresponds by the specified network elements starting from an initial moment of available transmission time of the current TDM period after the upper network element sends a plurality of the data bursts; and
    when the time stamp information does not correspond to the initial moment of the current TDM period, sending the data bursts to which the time stamp information corresponds by the specified network elements starting from the initial moment of the available transmission time of a TDM period next to the current TDM period after the upper network element sends a plurality of the data bursts.

7. The method of claim 6, wherein the available transmission time is a time period of the radio interface resources used for sending the data packets.

8. The method of claim 1, further comprising:
    when the time stamp information corresponds to an initial moment of available transmission time of a current TDM period, sending the data bursts to which the time stamp information corresponds by the specified network elements starting from an initial moment of the available transmission time of the current TDM period after the upper network element sends a plurality of the data bursts; or,
    when the time stamp information does not correspond to the initial moment of the available transmission time of the TDM period, sending the data bursts to which the time stamp information corresponds by the specified network elements starting from the initial moment of the available transmission time of a TDM period next to the current TDM period after the upper network element sends a plurality of the data bursts.

9. The method of claim 1, wherein the data burst is a group of data packets with same time stamp information.

10. The method of claim 1, wherein the data packets of the data burst further include the sequence number of the data packets and accumulated data length.

11. A synchronization scheduling method, comprising:
    sending a plurality of data bursts of a specified service by an upper network element to specified network elements belonging to the upper network element, wherein data packets of the data bursts all include time stamp information so that the specified network elements send a plurality of the data bursts according to the time stamp information; and
    setting difference between the time stamp information of every two adjacent data bursts by the upper network element to be one of exactly divided parts of a Time Division Multiplex (TDM) period of the specified service, wherein length of the TDM period is one of exactly divided parts of a system frame number period of a radio interface.

* * * * *